United States Patent
Iwao

(10) Patent No.: US 11,533,407 B2
(45) Date of Patent: Dec. 20, 2022

(54) SERVICE PROVISION SYSTEM AND NON-TRANSITORY COMPUTER READABLE MEDIUM PROVIDING SERVICES TO USER CARRYING TRANSMITTER

(71) Applicant: FUJIFILM Business Innovation Corp., Tokyo (JP)

(72) Inventor: Kazumasa Iwao, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 141 days.

(21) Appl. No.: 16/525,547

(22) Filed: Jul. 29, 2019

(65) Prior Publication Data

US 2020/0053240 A1    Feb. 13, 2020

(30) Foreign Application Priority Data

Aug. 8, 2018   (JP) ............................. JP2018-149614

(51) Int. Cl.
  *H04N 1/00*    (2006.01)
  *G03G 15/00*   (2006.01)
  *G06F 3/12*    (2006.01)

(52) U.S. Cl.
  CPC ....... *H04N 1/00517* (2013.01); *H04N 1/0097* (2013.01); *H04N 1/00474* (2013.01);
  (Continued)

(58) Field of Classification Search
  None
  See application file for complete search history.

(56) References Cited

U.S. PATENT DOCUMENTS 8,724,136 B2   5/2014 Yamamoto
8,738,480 B2 *  5/2014 Ray ...................... G06Q 20/047
                                          358/1.1
(Continued)

FOREIGN PATENT DOCUMENTS

JP   2005210310    8/2005
JP   2011-243017   12/2011
(Continued)

OTHER PUBLICATIONS

"Office Action of Japan Counterpart Application" with English translation thereof, dated Apr. 19, 2022, p. 1-p. 5.
(Continued)

*Primary Examiner* — Haris Sabah
(74) *Attorney, Agent, or Firm* — JCIPRNET

(57) ABSTRACT

A service provision system includes an extraction unit that extracts an associated service corresponding to a user of a service provision apparatus from plural services of the service provision apparatus, a storage control unit that stores, in a storage unit, identification information for identifying a transmitter which is carried by the user and which transmits a wireless signal and information regarding the associated service while associating the identification information and the information regarding the associated service with each other, an obtaining unit that obtains the identification information included in the wireless signal transmitted without requiring the user to perform an operation, and a display control unit that receives, from the storage control unit, the associated service corresponding to the identification information obtained by the obtaining unit and that displays the associated service on a display unit of the service provision apparatus.

20 Claims, 15 Drawing Sheets

(52) U.S. Cl.
CPC ..... _H04N 1/00514_ (2013.01); _G03G 15/5091_ (2013.01); _G06F 3/1231_ (2013.01); _H04N 1/0009_ (2013.01); _H04N 2201/0094_ (2013.01)

(56) References Cited

U.S. PATENT DOCUMENTS

| | | | |
|---|---|---|---|
| 9,063,684 B2 | 6/2015 | Yamamoto | |
| 9,247,084 B2 | 1/2016 | Yamamoto | |
| 9,955,029 B2 | 4/2018 | Yamamoto | |
| 10,306,086 B2 | 5/2019 | Yamamoto | |
| 10,701,226 B2 | 6/2020 | Yamamoto | |
| 2001/0021979 A1* | 9/2001 | Ito | H04N 1/32144 713/189 |
| 2004/0105126 A1* | 6/2004 | Minowa | G06Q 30/02 358/1.18 |
| 2005/0151992 A1* | 7/2005 | Shaw | G07F 7/02 358/1.14 |
| 2006/0082807 A1* | 4/2006 | Tanaka | G06F 3/1292 358/1.15 |
| 2012/0262749 A1* | 10/2012 | Yamamoto | H04N 1/00424 358/1.14 |
| 2017/0308339 A1* | 10/2017 | Yamazaki | H04N 1/2166 |
| 2018/0367701 A1* | 12/2018 | Saito | H04N 1/32778 |

FOREIGN PATENT DOCUMENTS

| | | |
|---|---|---|
| JP | 2011257936 | 12/2011 |
| JP | 2012222721 | 11/2012 |

OTHER PUBLICATIONS

"Notice of Reasons for Refusal of Japan Counterpart Application", dated Oct. 18, 2022, with English translation thereof, p. 1-p. 8.

* cited by examiner

FIG. 5

| ASSOCIATED SERVICE INFORMATION ~41 | | |
|---|---|---|
| TRANSMITTER ID | USER ID | ASSOCIATED SERVICE CM (PREVIOUS SERVICE) |
| TR0001 | U0001 | COPY_BLACK-AND-WHITE |
| TR0002 | U0002 | SPORT LOTTRIES_toto |
| TR0003 | U0003 | SCAN |
| ⋮ | | |

FIG. 14

| SERVICE USE NUMBER INFORMATION ~70 | | | |
|---|---|---|---|
| TRANSMITTER ID | USER ID | SERVICE | No. OF USES |
| TR0001 | U0001 | COPY_BLACK-AND-WHITE | 8 |
| | | COPY_COLOR | 15 |
| | | PRINT_PHOTOGRAPHY PRINT | 0 |
| | | PRINT_PLAIN PAPER PRINT | 0 |
| | | PRINT_POSTCARD PRINT | 0 |
| | | ⋮ | ⋮ |
| | | ADMINISTRATIVE SERVICES_SEAL REGISTRATION CERTIFICATE | 1 |
| TR0002 | U0002 | COPY_BLACK-AND-WHITE | 0 |
| | | COPY_COLOR | 0 |
| | | PRINT_PHOTOGRAPHY PRINT | 0 |
| | | PRINT_PLAIN PAPER PRINT | 0 |
| | | PRINT_POSTCARD PRINT | 0 |
| | | ⋮ | ⋮ |
| | | SPORT LOTTRIES_toto | 45 |
| | | ⋮ | ⋮ |
| | | ADMINISTRATIVE SERVICES_SEAL REGISTRATION CERTIFICATE | 0 |
| ⋮ | | | |

SERVICE PROVISION SYSTEM AND NON-TRANSITORY COMPUTER READABLE MEDIUM PROVIDING SERVICES TO USER CARRYING TRANSMITTER

CROSS-REFERENCE TO RELATED APPLICATIONS

This application is based on and claims priority under 35 USC 119 from Japanese Patent Application No. 2018-149614 filed Aug. 8, 2018.

BACKGROUND

(i) Technical Field

The techniques in the present disclosure relate to a service provision system and a non-transitory computer readable medium.

(ii) Related Art

Japanese Unexamined Patent Application Publication No. 2011-243017 discloses an information processing apparatus that can be used after authentication. The information processing apparatus includes a near-field communication (NFC) unit that includes a memory storing authentication information regarding users and use terminal identifiers (IDs) for identifying mobile communication terminals associated with the users and that performs NFC with an NFC device that performs NFC, an authentication information storage unit that stores authentication information regarding authenticated users as registered authentication information, a first authentication unit that performs a first authentication process by comparing authentication information obtained by the NFC unit from the NFC device with the registered authentication information stored in the authentication information storage unit, a second authentication unit that, if the first authentication unit successfully completes the first authentication process, performs a second authentication process by causing the NFC unit to perform the NFC and obtain a terminal ID of a communication terminal from the communication terminal and comparing the terminal ID of the communication terminal with the use terminal IDs, and a control unit that, if the second authentication unit successfully completes the second authentication process, allows the information processing apparatus to be used.

SUMMARY

In the case of a service provision apparatus used by a plurality of users, such as a multifunction peripheral (MFP) installed in a convenience store, different users desire to use different services. It is therefore desirable to provide a service (hereinafter referred to as an "associated service") that suits each user.

A method for providing an associated service is, for example, as follows. First, identification information (ID) regarding a user dedicated for a service provision apparatus is issued at the request of the user. The ID and information regarding an associated service are associated with each other. When the user uses the service provision apparatus, the ID is read, and the associated service corresponding to the read ID is displayed on a display unit of the service provision apparatus. As a method for reading an ID, for example, an integrated circuit (IC) card storing the ID may be delivered to a user, and the ID may be read by a card reader that performs NFC with the IC card at a distance of about 10 cm.

In this method, however, a user needs to actively perform some operations, such as issuance of an ID and holding of an IC card near a card reader.

Aspects of non-limiting embodiments of the present disclosure relate to a service provision system and a non-transitory computer readable medium capable of providing a service associated with a user without requiring the user to perform operations.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a service provision system including an extraction unit that extracts an associated service corresponding to a user of a service provision apparatus from a plurality of services of the service provision apparatus, a storage control unit that stores, in a storage unit, identification information for identifying a transmitter which is carried by the user and which transmits a wireless signal and information regarding the associated service while associating the identification information and the information regarding the associated service with each other, an obtaining unit that obtains the identification information included in the wireless signal transmitted without requiring the user to perform an operation, and a display control unit that receives, from the storage control unit, the associated service corresponding to the identification information obtained by the obtaining unit and that displays the associated service on a display unit of the service provision apparatus.

BRIEF DESCRIPTION OF THE DRAWINGS

Exemplary embodiments of the present disclosure will be described in detail based on the following figures, wherein:

FIG. 5 is a diagram illustrating associated service information;

FIG. 7A illustrates a service display screen in which an associated service is superimposed upon initial services, and FIG. 7B illustrates a service display screen including the initial services;

FIG. 8A illustrates a service display screen including the initial services, and FIG. 8B illustrates a service display screen including sub-services;

FIG. 14 is a diagram illustrating service use count information; and

DETAILED DESCRIPTION

First Exemplary Embodiment

Figure 1:
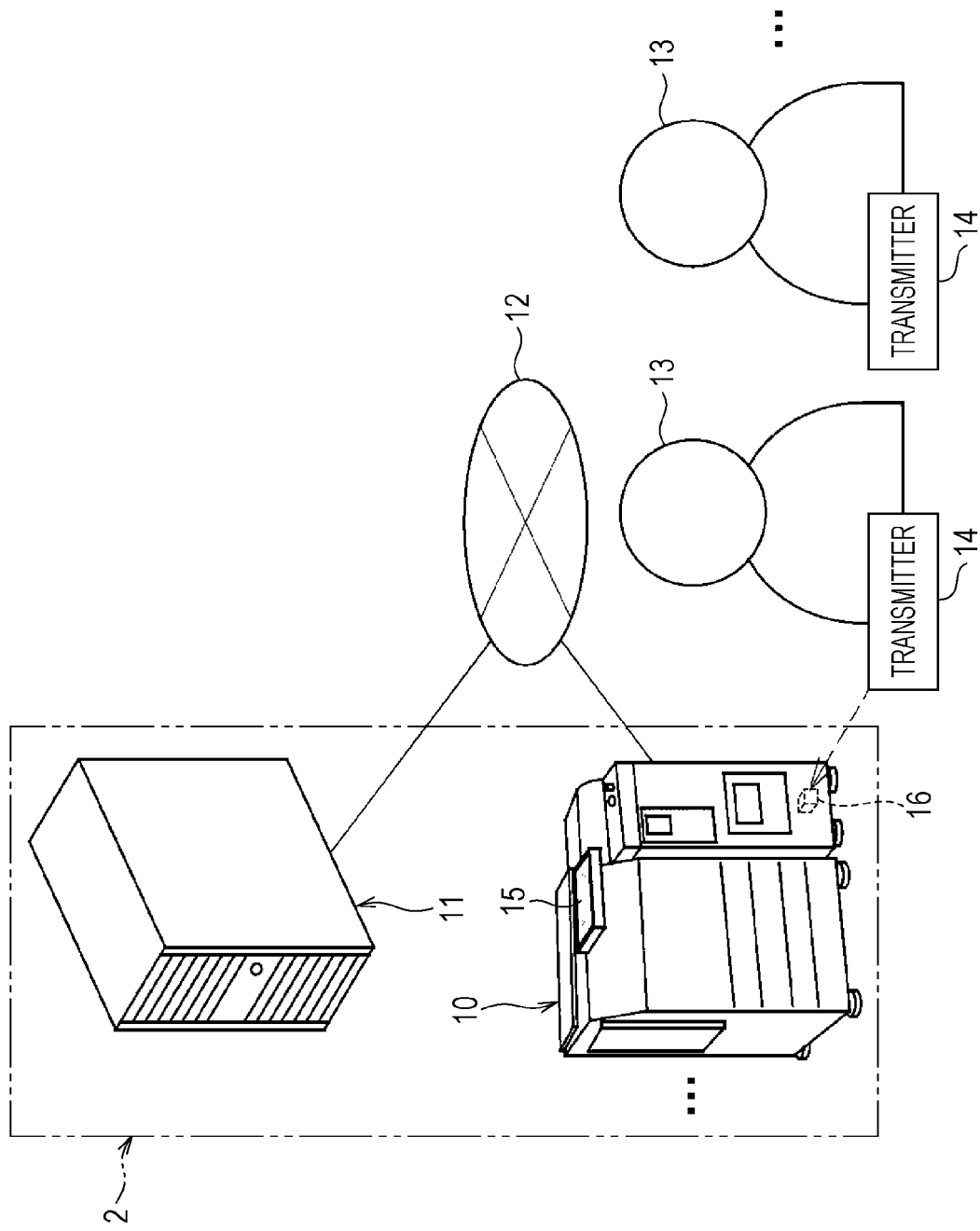
FIG. 1 is a diagram illustrating a service provision system.

In FIG. 1, a service provision system 2 includes a service provision apparatus 10 and a management server 11. The service provision apparatus 10 is installed in a store such as a convenience store. The service provision apparatus 10 is a so-called "MFP" having functions of a copier, a printer, a scanner, a facsimile, and the like. In addition to these functions, the service provision apparatus 10 has a function of receiving various services such as ticketing services, prepayment services, sport lottery services, and administrative services. The service provision apparatus 10 has a plurality of services corresponding to the various functions (refer to FIG. 2). The management server 11 manages the service provision apparatus 10. The service provision apparatus 10 and the management server 11 are communicably connected to each other by a wide area network (WAN) 12 such as the Internet or a public communication line.

The management server 11 is based on a computer such as a server computer or a work station. The management server 11 is achieved by installing control programs such as an operating system and various application programs on the computer.

Users 13 of the service provision apparatus 10 carry transmitters 14. The transmitters 14 transmit wireless signals (also called "beacon signals") for wireless communication such as Bluetooth (registered trademark). The transmitters 14 transmit wireless signals, for example, once every second within a communicable range of 10 to 50 m. The wireless signals include transmitter IDs (refer to FIG. 5, etc.), which is identification information regarding the transmitters 14.

The transmitters 14 transmit wireless signals without requiring the users 13 to perform operations. More specifically, each transmitter 14 includes a battery, which is disconnected by an insulating sheet at purchase. The user 13 pulls out the insulating sheet to connect the battery. After the battery is connected, the transmitter 14 keeps transmitting wireless signals until the battery runs out.

The transmitters 14 are sold on the market as devices for protecting elderly people in nursing facilities and children and have a platy shape several centimeters long. The transmitters 14 can be carried in pockets or using key chains.

The service provision apparatus 10 includes a touch panel display (hereinafter referred to as a "touch panel") 15, which corresponds to a display unit. The touch panel 15 displays various screens for the users 13 and receives various instructions from the users 13 through the various screens. The various screens include a service display screen 60 (refer to FIGS. 7A and 7B, etc.), and the various instructions include an instruction to select a service (hereinafter referred to as a "service selection instruction").

The service provision apparatus 10 includes a receiver 16 that receives wireless signals from the transmitters 14. The service provision apparatus 10 transmits a transmitter ID of a transmitter 14 included in a wireless signal received by the receiver 16 to the management server 11 through the WAN 12. The service provision apparatus 10 transmits a transmitter ID to the management server 11 if the receiver 16 receives a wireless signal from a transmitter 14 for the first time or if a service selection instruction is received on the touch panel 15.

The receiver 16 receives a wireless signal from a transmitter 14 for the first time when a user 13 visits a store in which the service provision apparatus 10 is installed. A service selection instruction that triggers transmission of a transmitter ID to the management server 11 is an instruction to select a sub-service SM illustrated in FIG. 2. In the case of a service (hereinafter referred to as an "initial service") DM that does not include a sub-service SM ("scan" or "fax" in FIG. 2), transmission of a transmission ID to the management server 11 is triggered by an instruction to select the initial service DM.

Figure 2:
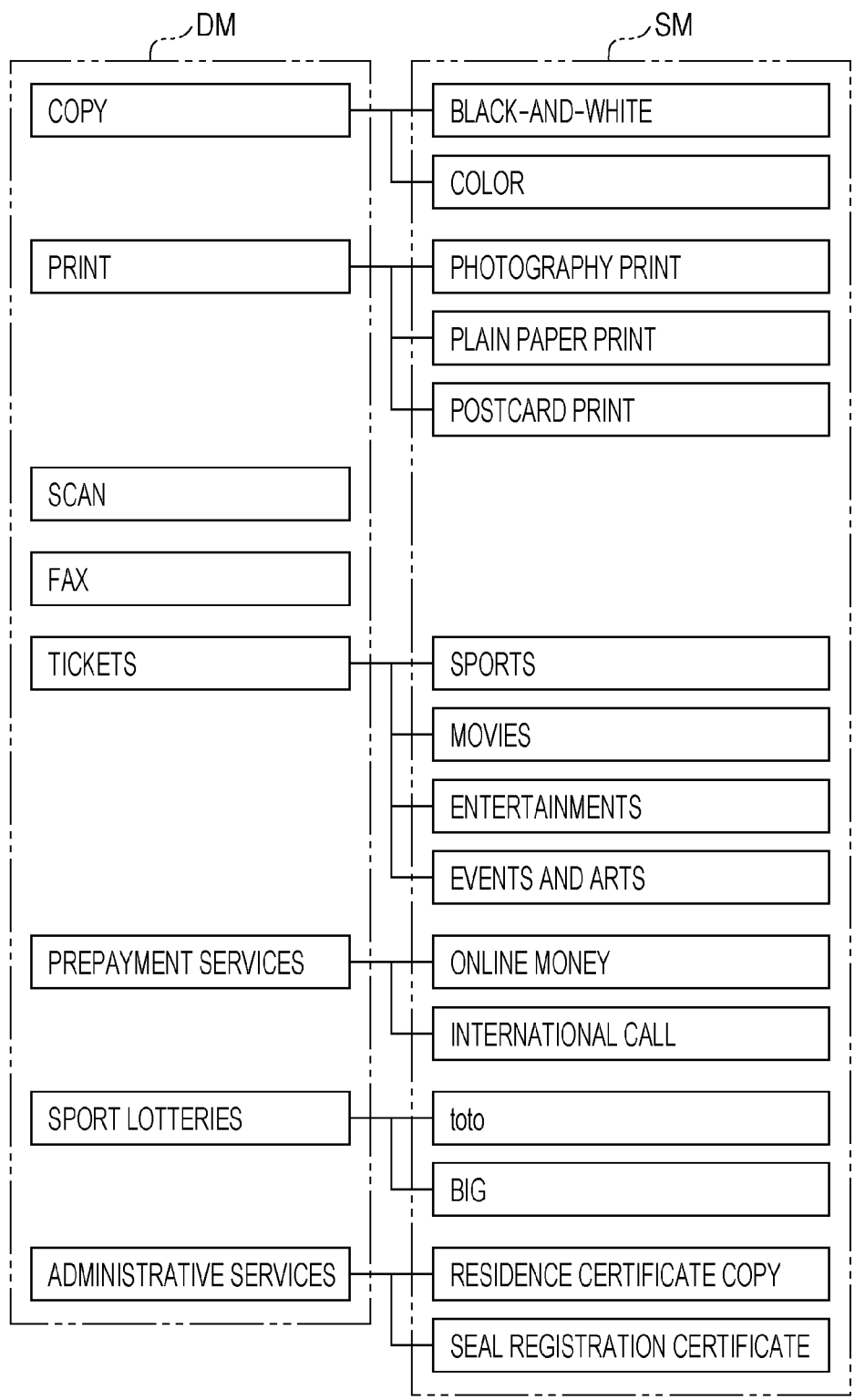
FIG. 2 is a diagram illustrating services of a service provision apparatus.

In FIG. 2, services of the service provision apparatus 10 has a hierarchical structure including initial services DM and sub-services SM under the initial services DM. The initial services DM are displayed first on the touch panel 15 of the service provision apparatus 10 regardless of the user 13. The initial services DM include "copy", "print", "scan", "fax", "tickets", "prepayment services", "sport lotteries", and "administrative services". "Copy" as an initial service DM includes "black-and-white" and "color" as sub-services SM. Similarly, "print" includes "photography print", "plain paper print", and "postcard print". "Tickets" includes "sports", "movies", "entertainments", and "events and arts" as sub-services SM. "Prepayment services" includes "online money" and "international call". "Sport lotteries" includes "toto" and "BIG". "Administrative services" includes "residence certificate copy" and "seal registration certificate" as sub-services SM. "Scan" and "fax" do not include anything as sub-services SM. The initial services DM and the sub-services SM described above are examples, and any other items may be included. For example, "tickets" as an initial service DM may include "concert tickets" and "express bus tickets" as sub-services SM. In addition, two or more classes of sub-services SM may be used.

Figure 3:
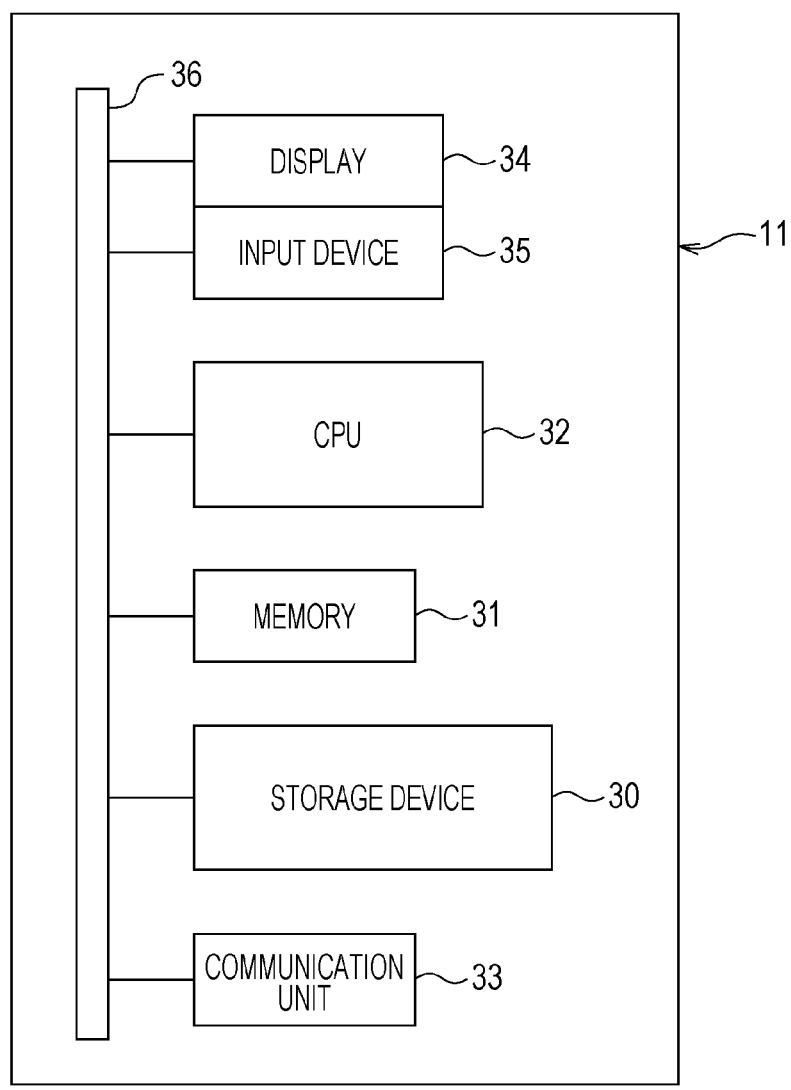
FIG. 3 is a block diagram illustrating a computer that serves as a management server.

In FIG. 3, the computer that serves as the management server 11 includes a storage device 30, a memory 31, a CPU 32, a communication unit 33, a display 34, and an input device 35. These components are connected to one another through a data bus 36.

The storage device 30 corresponds to a storage unit and is a hard disk drive incorporated into the computer that serves as the management server 11 or connected to the computer through a cable or a network. Alternatively, the storage device 30 is a disk array including a plurality of hard disk drives. The storage device 30 stores control programs such as an operating system, various application programs, and various pieces of data accompanying the control programs and the application programs.

The memory 31 is a working memory used by the CPU 32 to perform processing. The CPU 32 loads the programs stored in the storage device 30 into the memory 31 and performs processing according to the programs to control the other components of the computer.

The communication unit 33 is a network interface that transmits various pieces of information through the WAN 12. The display 34 displays various screens. The computer that serves as the management server 11 receives various instructions from the input device 35 through the various screens. The input device 35 is a keyboard, a mouse, or a touch panel.

Figure 4:
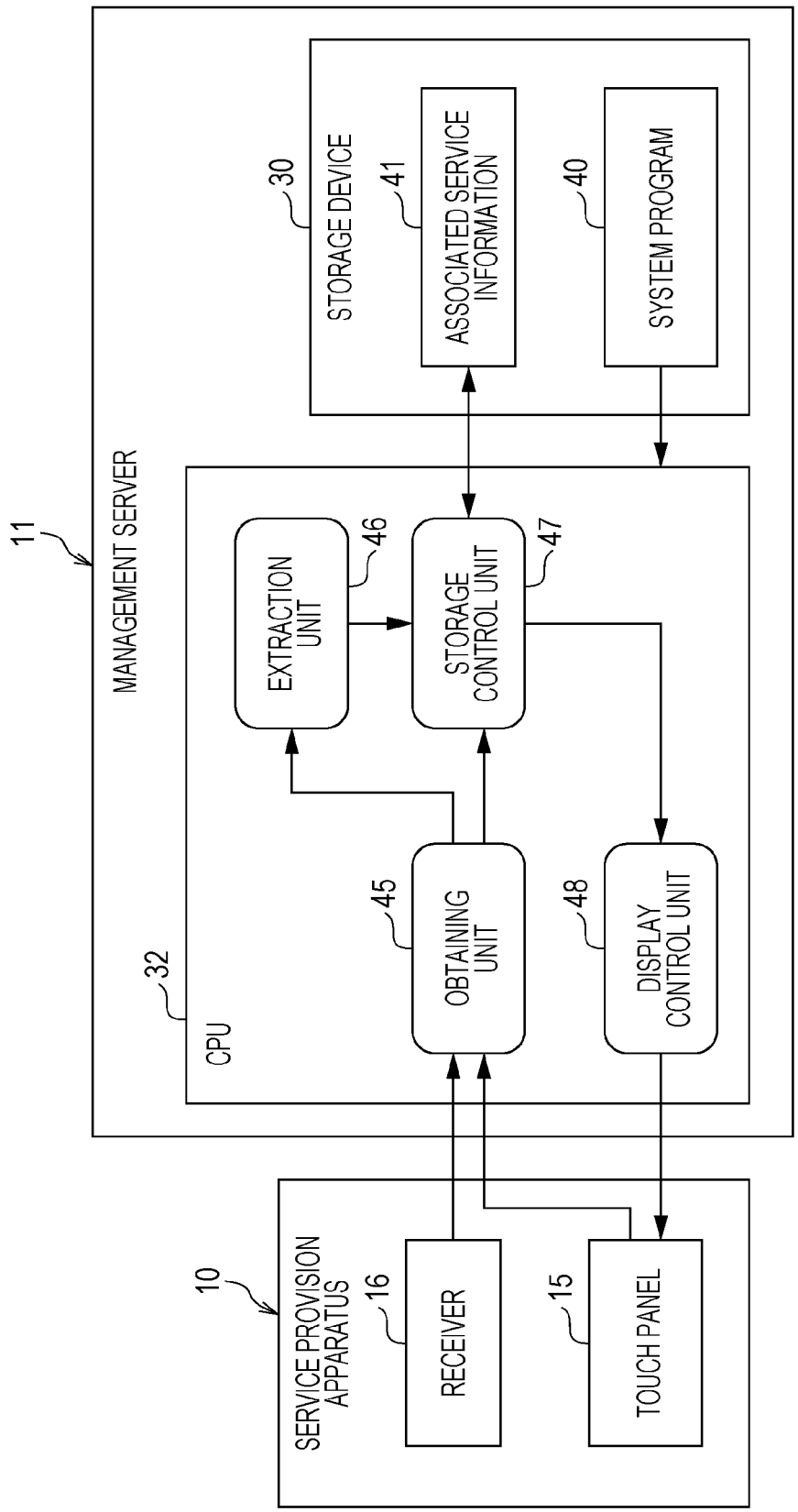
FIG. 4 is a block diagram illustrating processing units of a central processing unit (CPU) of the management server.

In FIG. 4, the storage device 30 of the management server 11 stores a program (hereinafter referred to as a "system program") 40 for the service provision system 2 as an application program. The storage device 30 also stores associated service information 41 in addition to the system program 40.

If the system program 40 is executed, the CPU 32 of the management server 11 functions as an obtaining unit 45, an extraction unit 46, a storage control unit 47, and a display control unit 48 in combination with the memory 31 and other components.

The obtaining unit 45 obtains a transmitter ID of a transmitter 14 transferred from the receiver 16. As described above, a transmitter ID is transferred from the service provision apparatus 10 if the receiver 16 has received a wireless signal for the first time or if the touch panel 15 has received a service selection instruction. The obtaining unit 45 therefore obtains a transmitter ID if the receiver 16 has received a wireless signal for the first time or if the touch panel 15 has received a service selection instruction. In a former case, an obtained transmitter ID will be referred to as a "pre-service selection instruction transmitter ID". In a latter case, an obtained transmitter ID will be referred to as a "post-service selection instruction transmitter ID".

When obtaining a post-service selection instruction transmitter ID, the obtaining unit 45 also obtains information regarding a service selection instruction from the touch panel 15. The obtaining unit 45 then outputs the post-service selection instruction transmitter ID and the information regarding the service selection instruction to the extraction unit 46. The obtaining unit 45 outputs a pre-service selection instruction transmitter ID to the storage control unit 47.

The extraction unit 46 extracts an associated service CM (refer to FIG. 5, etc.) corresponding to a user 13 from a plurality of services. More specifically, the extraction unit 46 extracts, as the associated service CM, a service indicated by information regarding a service selection instruction received from the obtaining unit 45 when the user 13 used the service provision apparatus 10 last time. The service indicated by information regarding a service selection instruction received from the obtaining unit 45 when the user 13 used the service provision apparatus 10 last time is a service used by the user 13 last time (hereinafter referred to as a "previous service"). That is, the extraction unit 46 extracts, as the associated service CM, a service that was used by the user 13 on the service provision apparatus 10 last time, which is a previous service of the user 13. The extraction unit 46 outputs the extracted associated service CM to the storage control unit 47.

The storage control unit 47 associates transmitter IDs and information regarding associated services CM with each other and stores the transmitter IDs and the information regarding the associated services CM as the associated service information 41 of the storage device 30. The storage control unit 47 also reads, from the associated service information 41, an associated service CM corresponding to a pre-service selection instruction transmitter ID transferred from the obtaining unit 45. The storage control unit 47 then outputs the read associated service CM to the display control unit 48.

The display control unit 48 generates various screens to be displayed on the touch panel 15 and outputs the generated various screens to the touch panel 15. More specifically, the display control unit 48 receives an associated service CM from the storage control unit 47. The display control unit 48 then displays the received associated service CM on the touch panel 15.

As illustrated in FIG. 5, the storage control unit 47 associates transmitter IDs, user IDs, and associated services CM with one another in advance in the associated service information 41. The user IDs are identification information for identifying the users 13.

Figure 6:
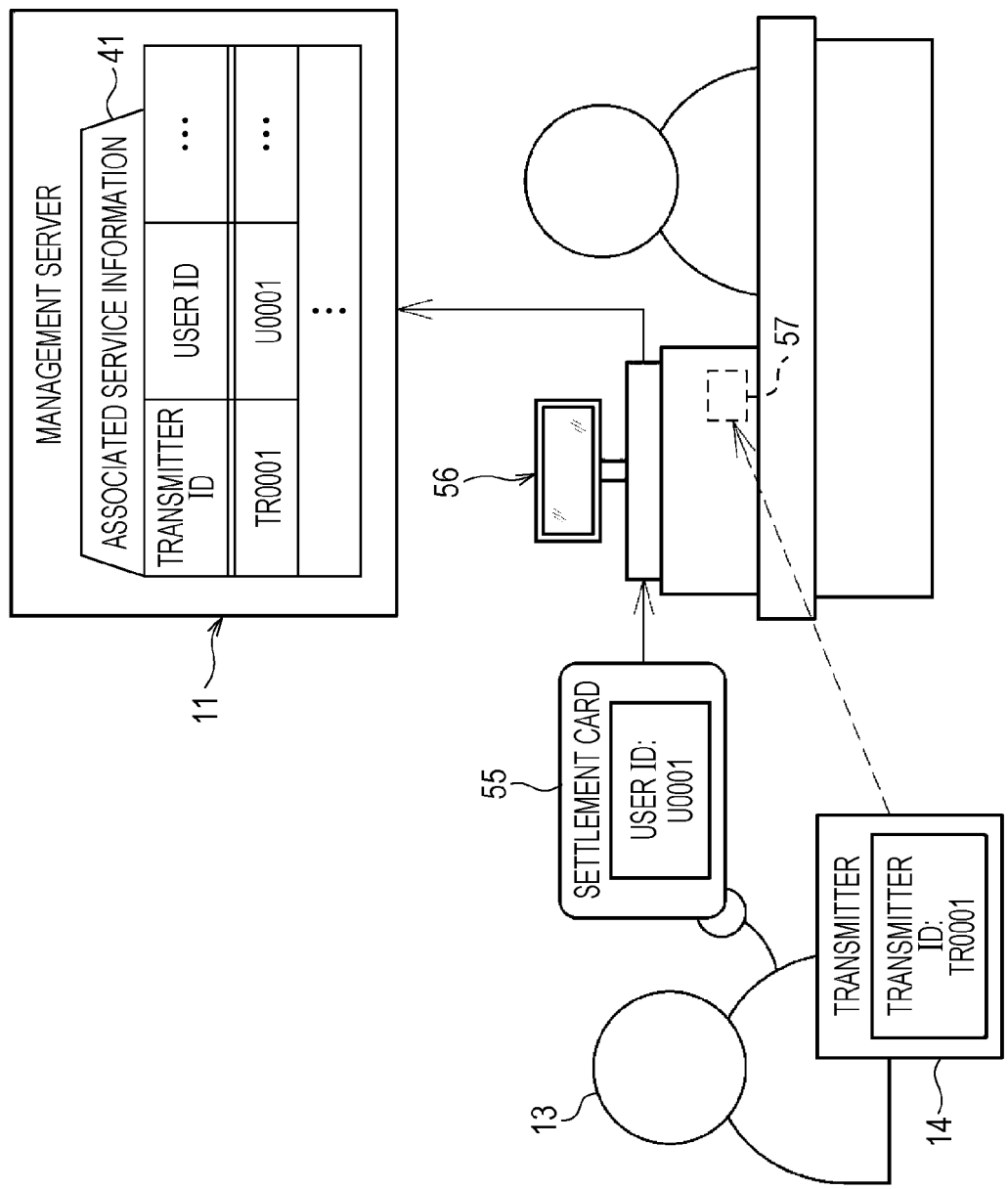
FIG. 6 is a diagram illustrating an example of association of a transmitter ID and a user ID with each other.

FIG. 6 illustrates an example of association of a transmitter ID and a user ID with each other. A user 13 carries a settlement card 55 as well as a transmitter 14. The settlement card 55 is so-called "electronic money", with which payment for a product can be made at a register 56 in a store in which the service provision apparatus 10 is installed. The settlement card 55 can be used only at stores in which service provision apparatuses 10 are installed. The settlement card 55 stores a user ID. The user 13 registers his/her personal information, such as name, gender, date of birth, and address, in order to receive the settlement card 55. The user ID is stored in the storage device 30 of the management server 11 and associated with these pieces of personal information.

The register 56 includes, as with the service provision apparatus 10, a receiver 57 that receives wireless signals from transmitters 14. The register 56 senses the settlement card 55 and reads a user ID from the settlement card 55. The register 56 transmits, to the management server 11, a transmitter ID included in a wireless signal received by the receiver 57 when the user ID has been read from the settlement card 55 and the user ID read from the settlement card 55.

In the management server 11, the obtaining unit 45 obtains the transmitter ID and the user ID and outputs the transmitter ID and the user ID to the storage control unit 47. The storage control unit 47 registers the transmitter ID and the user ID in the associated service information 41. As a result, the transmitter ID and the user ID are associated with each other. If the user 13 does not carry a settlement card 55, on the other hand, a transmitter ID and a user ID need to be registered in the management server 11. In FIG. 6, the associated service CM is omitted in the associated service information 41.

Figure 7A:
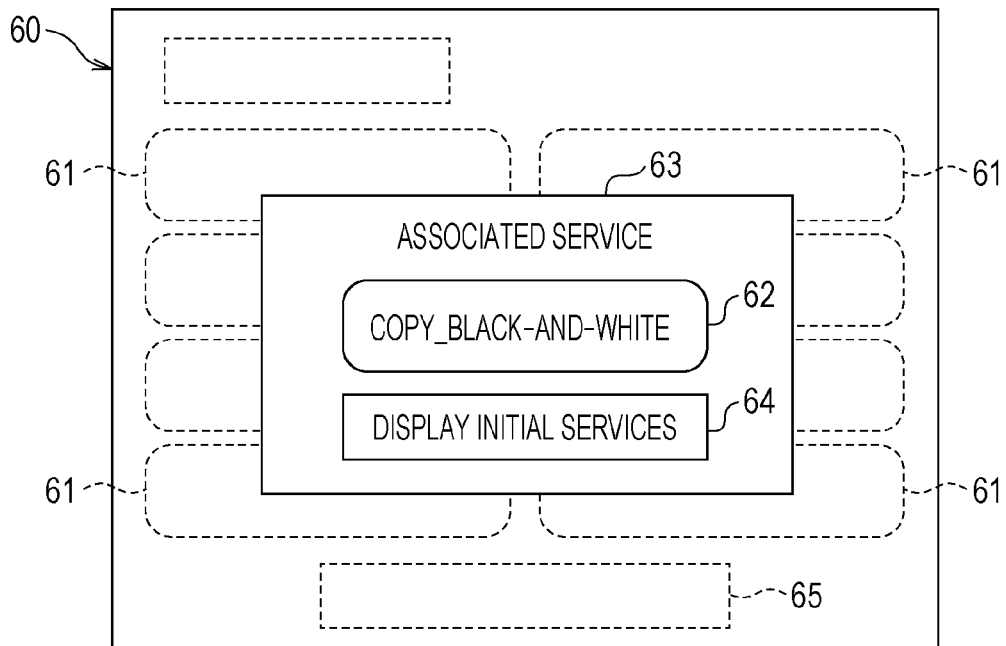
FIGS. 7A and 7B are diagrams illustrating service display screens.
Figure 7B:
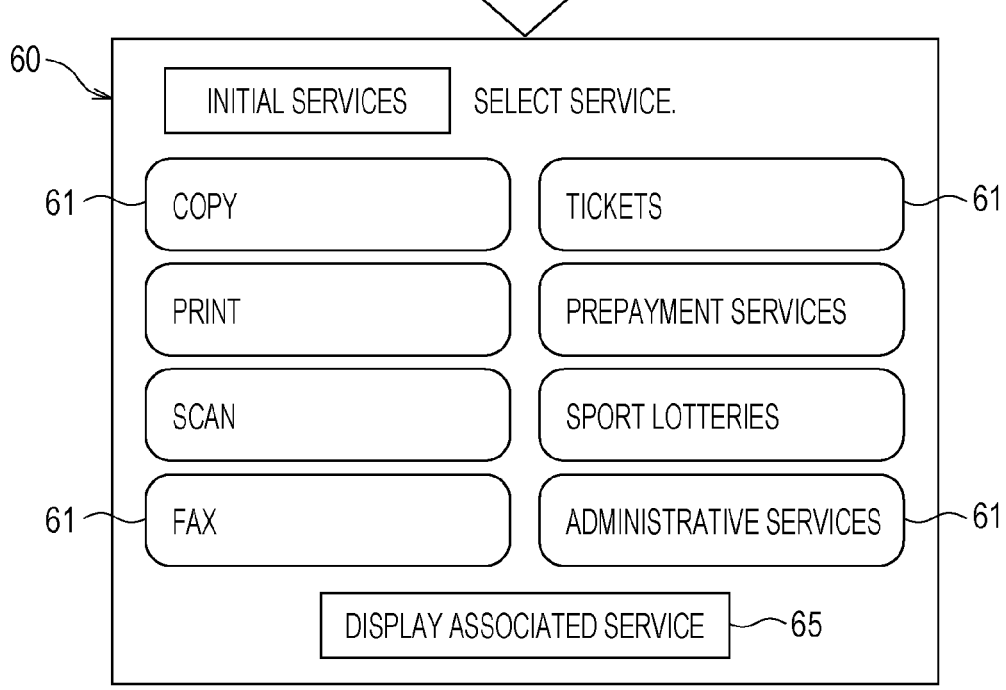

As illustrated in FIGS. 7A and 7B, the display control unit 48 generates the service display screen 60 and displays the service display screen 60 on the touch panel 15. FIG. 7A illustrates a service display screen 60 including an associated service CM superimposed upon the initial services DM, and FIG. 7B illustrates a service display screen 60 including the initial services DM.

The service display screen 60 illustrated in FIG. 7A is displayed first on the touch panel 15 after the obtaining unit 45 obtains a pre-service selection instruction transmitter ID. On the service display screen 60, a dialog box 63 including an associated service selection button 62 for selecting the associated service CM is superimposed upon initial service selection buttons 61 for selecting the initial services DM. As indicated by broken lines, the initial service selection buttons 61 are grayed out and disabled. The dialog box 63 is smaller than an area in which the initial service selection buttons 61 are arranged. That is, the display control unit 48 displays both the associated service CM and the initial services DM on the touch panel 15 in a distinguishable manner. The display control unit 48 superimposes the associated service CM smaller than the initial services DM upon the initial services DM.

The dialog box 63 includes an initial service display button 64. If the initial service display button 64 is selected, the display control unit 48 switches the service display screen 60 as illustrated in FIG. 7B.

In the service display screen 60 illustrated in FIG. 7B, the dialog box 63 is removed. The graying out of the initial service selection buttons 61 is canceled, and the initial services DM can be selected.

The service display screen 60 illustrated in FIG. 7B includes an associated service display button 65. If the associated service display button 65 is selected, the display control unit 48 resets the service display screen 60 to the state illustrated in FIG. 7A. That is, the display control unit 48 switches between the associated service CM and the initial services DM through a single operation.

Figure 8A:
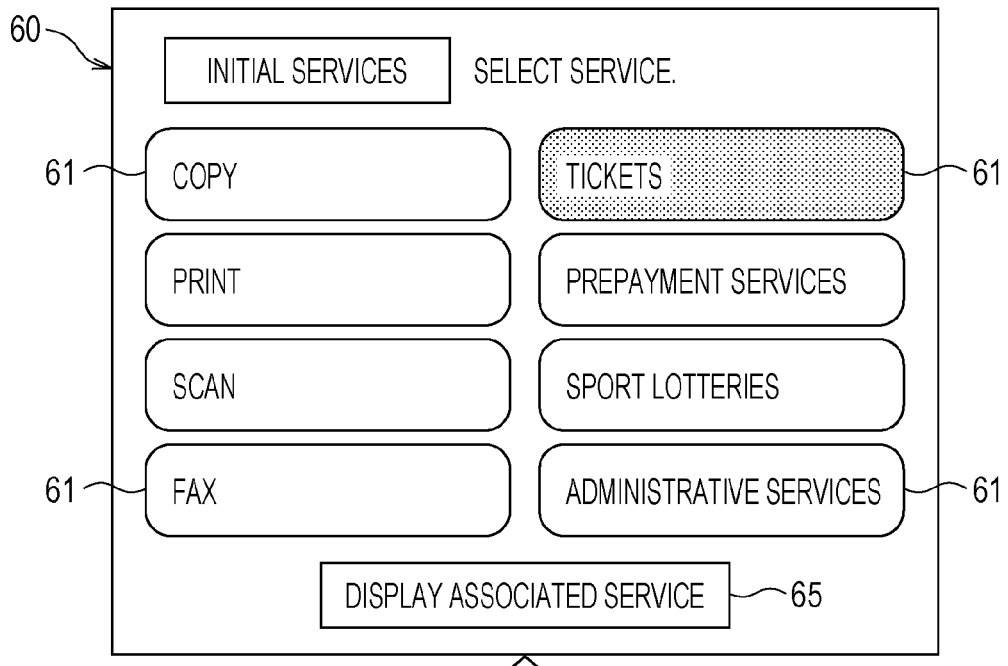
FIGS. 8A and 8B are diagrams illustrating service display screens.
Figure 8B:
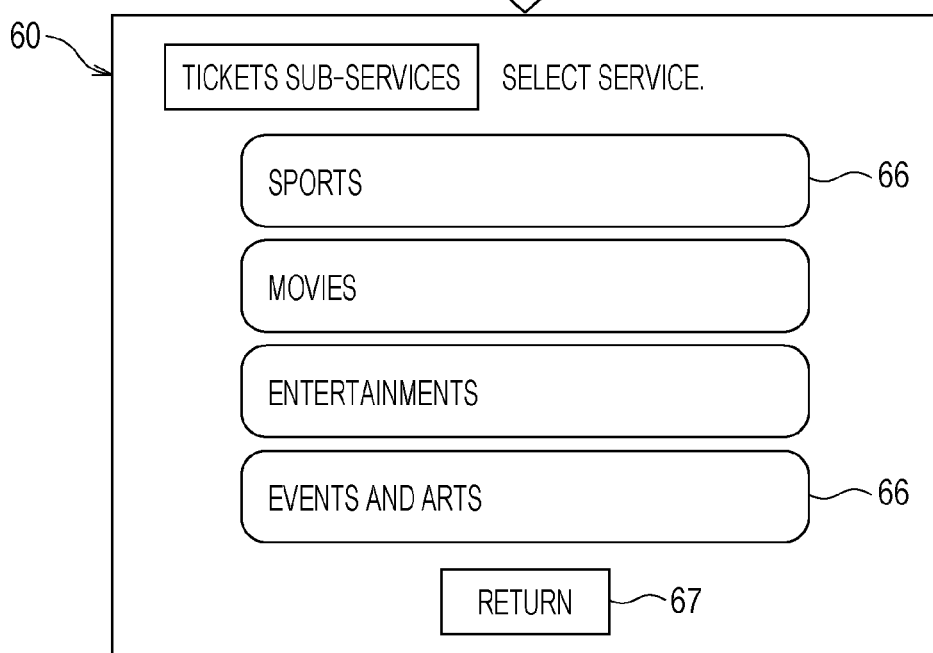

If one of the initial service selection buttons 61 is selected in the service display screen 60 illustrated in FIG. 7B, the display control unit 48 switches, as illustrated in FIGS. 8A and 8B, the service display screen 60 to a state in which sub-service selection buttons 66 for selecting sub-services SM are arranged.

FIGS. 8A and 8B illustrate, as indicated by hatching in FIG. 8A, a case where an initial service selection buttons 61 corresponding to "tickets" has been selected. In this case, as illustrated in FIG. 8B, a service display screen 60 including sub-service selection buttons 66 corresponding to "sports", "movies", "entertainments", and "events and arts", which are sub-services SM of "tickets", is displayed. A button 67 is used to reset the service display screen 60 to the state illustrated in FIG. 8A (FIG. 7B).

It is possible that the pre-service selection instruction transmitter ID obtained by the obtaining unit 45 is new and an associated service CM corresponding to the transmitter ID has not been registered in the associated service information 41. In this case, the display control unit 48 generates a service display screen 60 illustrated in FIG. 9 and displays the service display screen 60 on the touch panel 15. The service display screen 60 illustrated in FIG. 9 does not include the associated service display button 65 unlike the service display screen 60 including the initial service selection buttons 61 illustrated in FIG. 7B and the like. That is, if a transmitter ID obtained by the obtaining unit 45 is new and there is no associated service CM corresponding to the transmitter ID, the display control unit 48 displays the initial services DM on the touch panel 15.

Figure 10:
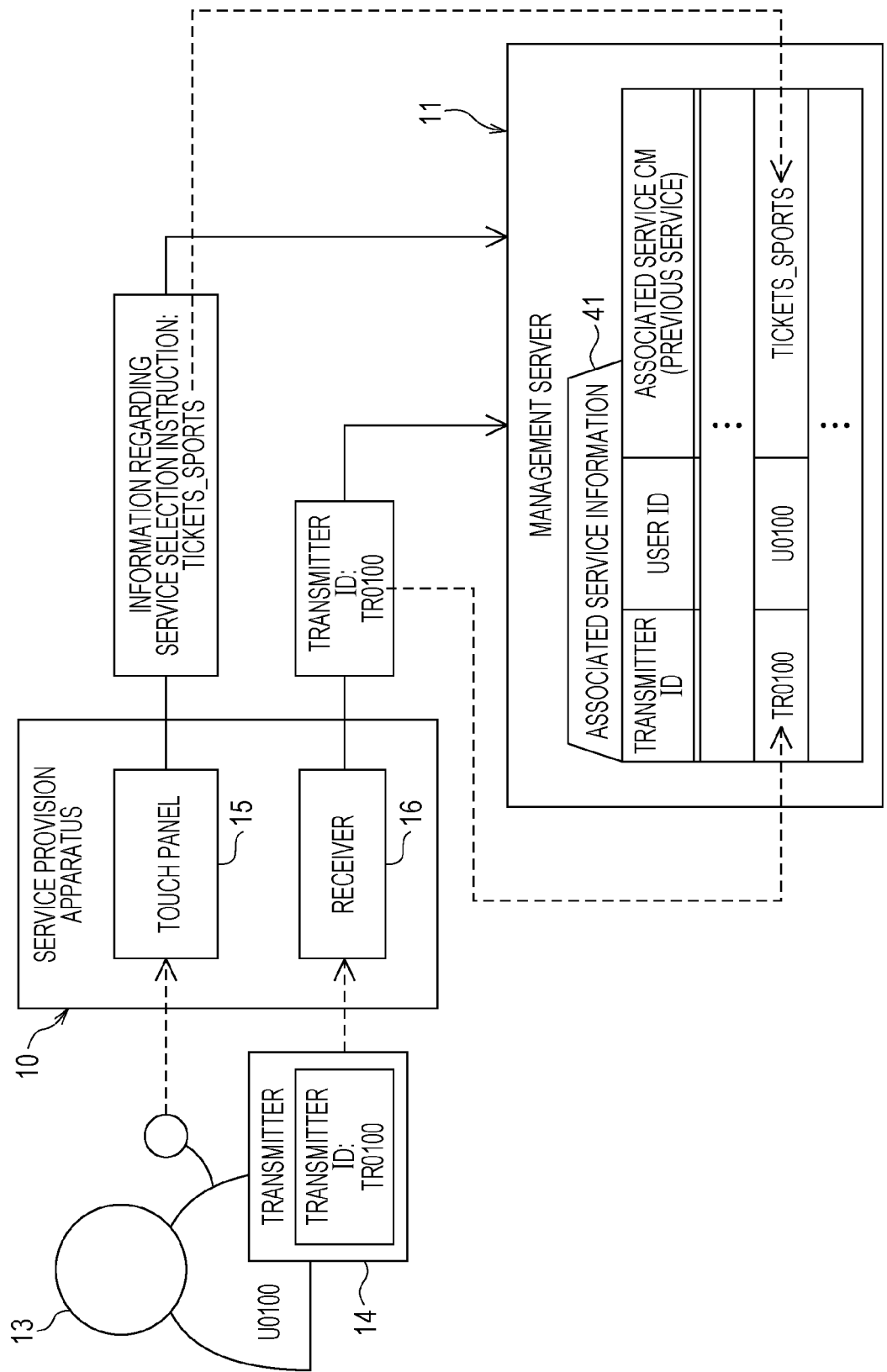
FIG. 10 is a diagram illustrating an example where a transmitter ID and information regarding an associated service are stored while being associated with each other.
Figure 11:
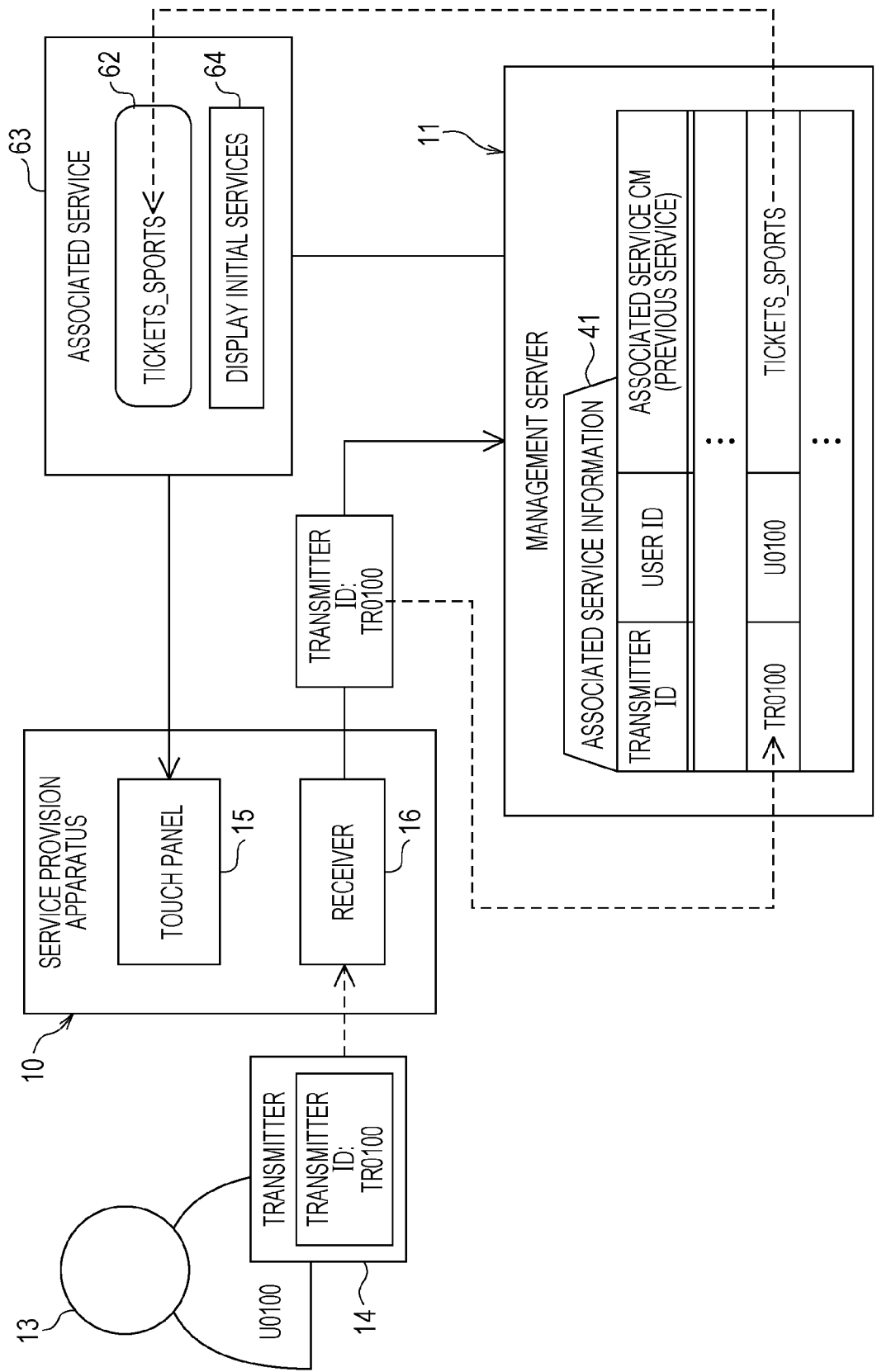
FIG. 11 is a diagram illustrating an example where the associated service corresponding to the transmitter ID is displayed on a touch panel of the service provision apparatus.

FIGS. 10 and 11 illustrate communication of various pieces of data between the service provision apparatus 10 and the management server 11 in the case of a user 13 whose user ID is U0100 and who carries a transmitter 14 having a transmitter ID of TR0100.

As illustrated in FIG. 10, the user 13 whose user ID is U0100 selects "tickets" as an initial service DM. The user 13 and then selects "sports" as a sub-service SM and purchases, using the service provision apparatus 10, a ticket for watching a sport game. At this time, the receiver 16 receives a wireless signal including the transmitter ID of TR0100 from the transmitter 14. As a result, information regarding a service selection instruction, which is "tickets sports", and a post-service selection instruction transmitter ID, which is TR0100, are transmitted to the management server 11 from the service provision apparatus 10.

The obtaining unit 45 of the management server 11 obtains the information regarding a service selection instruction, which is "tickets sports", and the post-service selection instruction transmitter ID, which is TR0100. The extraction unit 46 then extracts an associated service, which is "tickets sports", and the storage control unit 47 registers "tickets sports" in an associated service CM of the associated service information 41 corresponding to the transmitter ID of TR0100.

FIG. 11 illustrates a case where the user 13 whose user ID is U0100 and who carries the transmitter 14 having a transmitter ID of TR0100 tries to use the service provision apparatus 10 after "tickets sports" is registered as an associated service CM as illustrated in FIG. 10. In this case, a pre-service selection instruction transmitter ID, which is TR0100, is transmitted to the management server 11 from the service provision apparatus 10.

The obtaining unit 45 of the management server 11 obtains the pre-service selection instruction transmitter ID, which is TR0100. Next, the storage control unit 47 reads an associated service CM of the associated service information 41 corresponding to the transmitter ID, which is "tickets sports", and outputs the associated service CM to the display control unit 48. The display control unit 48 displays, on the touch panel 15, a service display screen 60 on which a dialog box 63 including an associated service selection button 62 corresponding to "tickets sports" is displayed (FIG. 11 illustrates only the dialog box 63).

An operation performed with the above configuration will be described hereinafter with reference to flowcharts of FIGS. 12 and 13. First, if the system program 40 is executed, the CPU 32 functions as the obtaining unit 45, the extraction unit 46, the storage control unit 47, and the display control unit 48 and the computer functions as the management server 11 as illustrated in FIG. 4.

Figure 12:
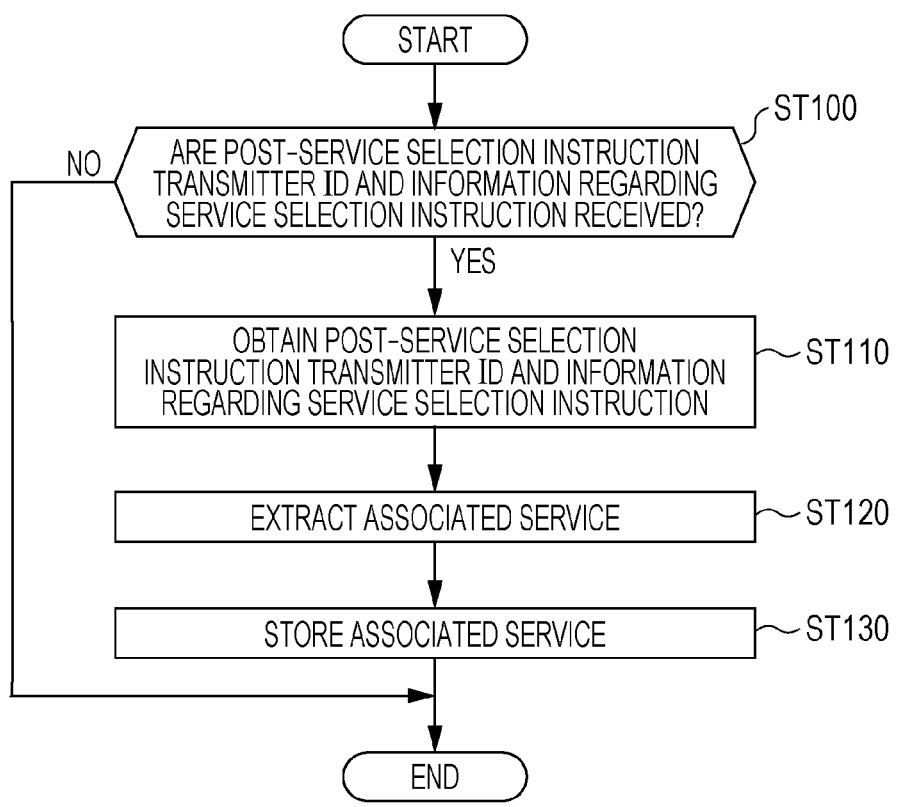
FIG. 12 is a flowchart illustrating a process performed by the management server.

In FIG. 12, the management server 11 waits for a post-service selection instruction transmitter ID and information regarding a service selection instruction from the service provision apparatus 10 (step ST100). If a post-service selection instruction transmitter ID and information regarding a service selection instruction are received (YES in step ST100), the obtaining unit 45 obtains the post-service selection instruction transmitter ID and the information regarding a service selection instruction (step ST110). The obtaining unit 45 outputs the post-service selection instruction transmitter ID and the information regarding a service selection instruction to the extraction unit 46.

The extraction unit 46 extracts, as an associated service CM, a service indicated by the information regarding a service selection instruction received from the obtaining unit 45, that is, a previous service, which is a service previously used by the user 13 on the service provision apparatus 10 (step ST120). The extraction unit 46 outputs the associated service CM to the storage control unit 47, and the storage control unit 47 stores the associated service CM in the associated service information 41 while associating the associated service CM with the transmitter ID (step ST130).

A case where a pre-service selection instruction transmitter ID is received by the management server 11 (YES in step ST200) will be described with reference to FIG. 13. In this case, the obtaining unit 45 obtains the pre-service selection instruction transmitter ID (step ST210). The obtaining unit 45 outputs the pre-service selection instruction transmitter ID to the storage control unit 47.

The storage control unit 47 reads, from the associated service information 41, the associated service CM corresponding to the pre-service selection instruction transmitter ID output from the obtaining unit 45 (step ST220). The storage control unit 47 outputs the associated service CM to the display control unit 48.

As illustrated in FIG. 7A, the display control unit 48 displays a service display screen 60 in which the associated service CM is superimposed upon the initial services DM on the touch panel 15 of the service provision apparatus 10 (step ST230).

As described above, the extraction unit 46 extracts an associated service CM from a plurality of services, and the storage control unit 47 stores a transmitter ID and information regarding the associated service CM while associating the transmitter ID and the information with each other. The obtaining unit 45 obtains a transmitter ID included in a wireless signal of a transmitter 14 transmitted without requiring the user 13 to perform operations and displays an associated service CM corresponding to the obtained transmitter ID on the touch panel 15 of the service provision apparatus 10. An associated service CM corresponding to the user 13, therefore, is provided without requiring the user 13 to perform operations. As illustrated in FIG. 6, a transmitter ID and a user ID are associated with each other, too, without requiring the user 13 to perform operations.

If the services have a hierarchical structure such as that illustrated in FIG. 2 and a service desired by a user 13 is a sub-service SM, the user 13 needs to perform two operations, that is, the user 13 needs to select an initial service selection buttons 61 and then selects a sub-service selection button 66, as illustrated in FIGS. 8A and 8B. If the associated service CM indicated by the associated service selection button 62 illustrated in FIG. 7A is a sub-service SM desired by the user 13, however, the user 13 can select the sub-service SM through a single operation, that is, the user 13 only needs to select the associated service selection button 62, which improves efficiency.

The extraction unit 46 extracts an associated service CM from services used by a user 13 on the service provision apparatus 10 in the past. If a use history of the user 13 is stored, therefore, an associated service CM can be extracted without requiring the user 13 to perform any operation.

The extraction unit 46 extracts a previous service as an associated service CM. A service that a user 13 who tends to select the same service is likely to select, therefore, is extracted as the associated service CM.

The display control unit 48 displays both an associated service CM and the initial services DM on the service display screen 60 in a distinguishable manner. A user 13, therefore, recognizes not only the associated service CM but also the initial services DM.

The display control unit 48 superimposes an associated service CM smaller than the initial services DM upon the initial services DM on the service display screen 60. The associated service CM and the initial services DM, therefore, are easy to distinguish.

If the initial service display button 64 is selected on the service display screen 60 illustrated in FIG. 7A, the service display screen 60 including the initial services DM is displayed as illustrated in FIG. 7B. If the associated service display button 65 is selected on the service display screen 60 illustrated in FIG. 7B, on the other hand, the service display screen 60 illustrated in FIG. 7A is displayed.

The display control unit 48 thus switches between the associated service CM and the initial services DM through a single operation. If a user 13 desires to select a service other than the associated service CM, or if the user 13 first thinks of selecting another service but finally decides to select the associated service CM, therefore, a corresponding operation is promptly achieved.

Figure 9:
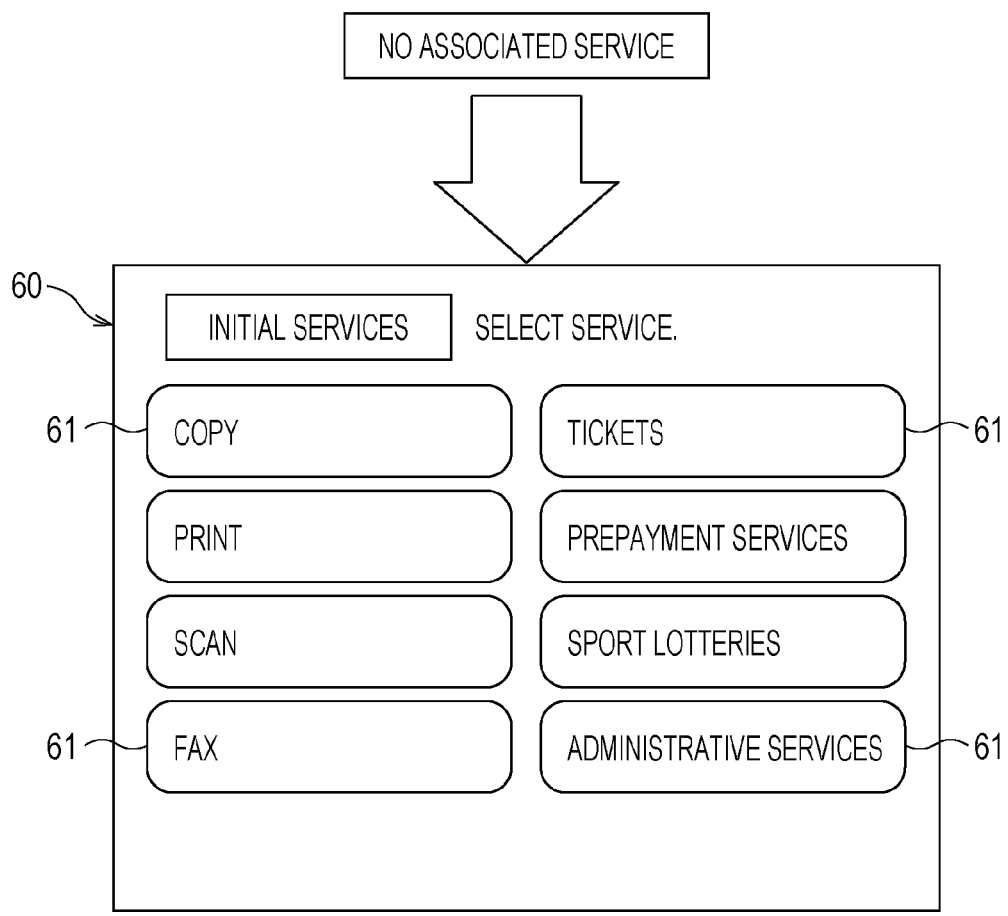
FIG. 9 is a diagram illustrating a service display screen at a time when there is no associated service.
Figure 13:
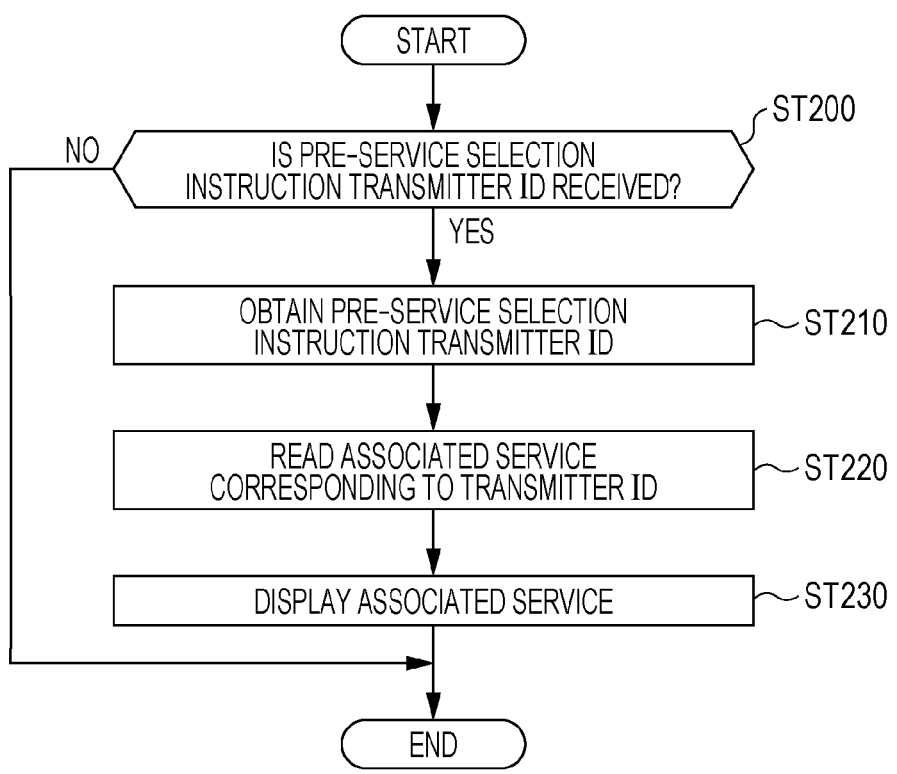
FIG. 13 is a flowchart illustrating a process performed by the management server.

Although not illustrated in FIG. 13, if there is no associated service CM corresponding to a pre-service selection instruction transmitter ID output from the obtaining unit 45 in step ST220, the service display screen 60 including the initial services DM illustrated in FIG. 9 is displayed on the touch panel 15 of the service provision apparatus 10.

If a transmitter ID obtained by the obtaining unit 45 is new and there is no associated service CM corresponding to the transmitter ID, the display control unit 48 thus displays the initial services DM. Even if there is no associated service CM, therefore, the service provision apparatus 10 is available to the user 13.

If there are a plurality of users 13 who carry transmitters 14 around the service provision apparatus 10, the receiver 16 might receive a plurality of wireless signals. In order to address such a situation, the receiver 16 may be provided with a function of measuring the signal intensity of wireless signals. The receiver 16 may selectively transmit, to the management server 11, a transmitter ID corresponding to a wireless signal whose signal intensity is the highest.

In FIG. 6, too, there might be a plurality of users 13 who carry transmitters 14 around the register 56, and the receiver 57 might receive a plurality of wireless signals. The receiver 57 may be provided with a function of measuring the signal intensity of wireless signals. The receiver 57 may selectively transmit, to the management server 11, a transmitter ID corresponding to a wireless signal whose signal intensity is the highest.

The receiver 16 may be separate from the service provision apparatus 10, instead. Similarly, the receiver 57 may be separate from the register 56, instead.

The associated service CM and the initial services DM may be displayed separately, instead. In addition, the associated service CM need not be superimposed upon the initial services DM but may be displayed side-by-side with the initial services DM. Furthermore, display tabs may be provided for the associated service CM and the initial services DM, and the associated service CM or the initial services DM may be displayed in accordance with selection of one of the display tabs.

Although the service display screen 60 illustrated in FIG. 7A is displayed first on the touch panel 15 after the obtaining unit 45 obtains a pre-service selection instruction transmitter ID, a screen to be displayed is not limited to this. The service display screen 60 illustrated in FIG. 7B may be displayed first on the touch panel 15, instead, after the obtaining unit 45 obtains a pre-service selection instruction transmitter ID.

Second Exemplary Embodiment

In a second embodiment illustrated in FIGS. 14 and 15, a service most used by a user 13 (hereinafter referred to as a "most used service") is extracted by the extraction unit 46 as an associated service CM.

FIG. 14 illustrates service use count information 70. The service use count information 70 indicates the number of uses of each service (the initial services DM such as "scan" and "fax" and the sub-services SM) for different transmitter IDs and user IDs. The service use count information 70 is stored in the storage device 30 and managed by the storage control unit 47. More specifically, the storage control unit 47 receives a post-service selection instruction transmitter ID and information regarding a service selection instruction from the obtaining unit 45. The storage control unit 47 then increments the number of uses of a service indicated by the information regarding a service selection instruction corresponding to the received post-service selection instruction transmitter ID.

FIG. 14 illustrates the number of uses of each service of a user 13 whose user ID is U0001 and who carries a transmitter 14 having a transmitter ID of TR0001 and another user. The user 13 whose user ID is U0001 has used "copy color" most, namely 15 times, "copy black-and-white" second most, namely eight times, and "administrative services seal registration certificate" once. The user 13 has not used other services. The user 13 whose user ID is U0002 has used only "sport lotteries toto", and the number of uses is 45.

Figure 15:
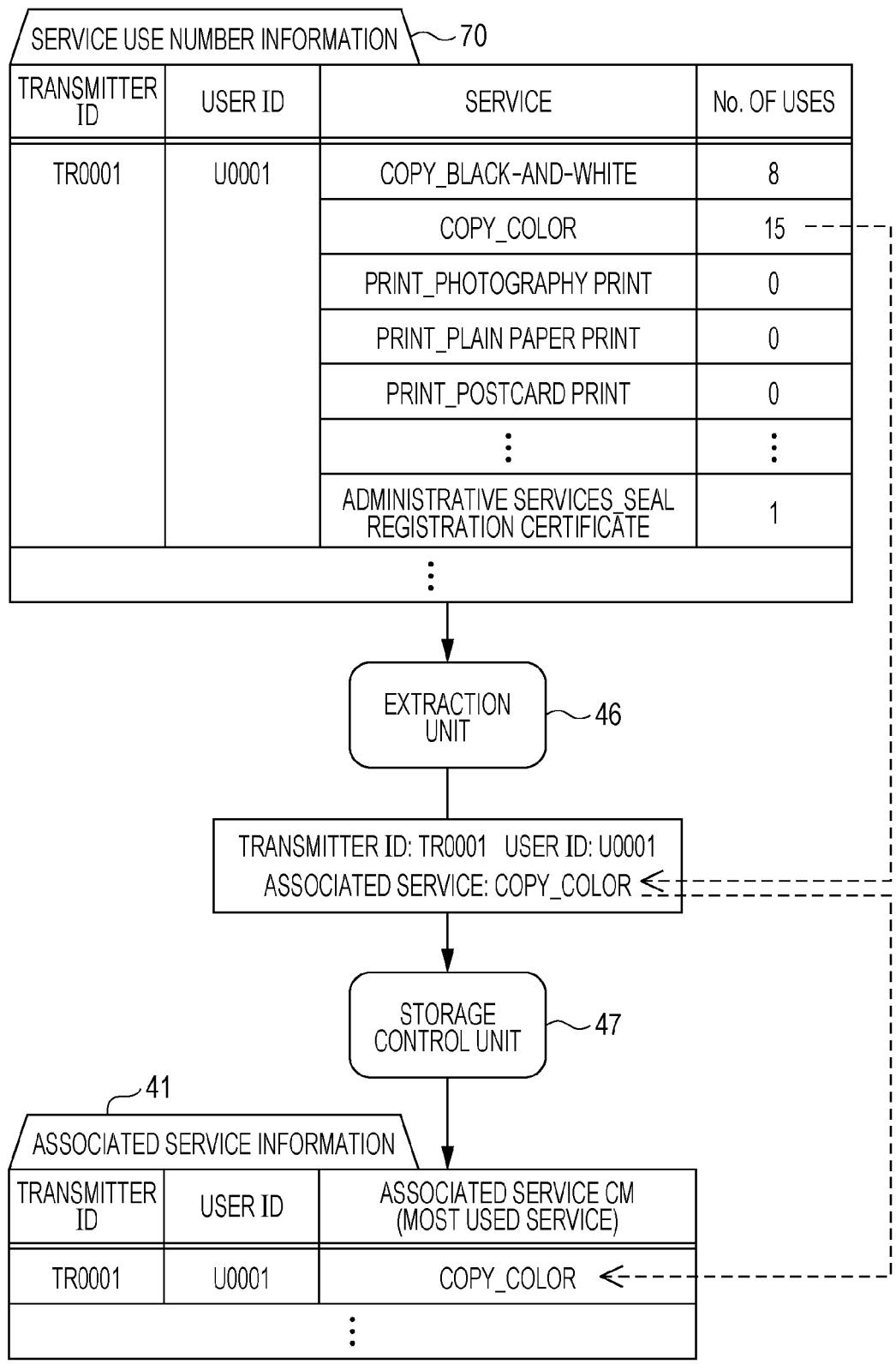
FIG. 15 is a diagram illustrating extraction of a service most used by a user as an associated service.

As illustrated in FIG. 15, the extraction unit 46 refers to the service use count information 70 and extracts most used services as associated services CM. In FIG. 15, "copy color", which is the most used service, is extracted as an associated service CM of the user 13 whose user ID is U0001 and who carries the transmitter 14 having the transmitter ID of TR0001. Although not illustrated, "sport lotteries toto" is extracted as an associated service CM of the user 13 whose user ID is U0002.

In this case, too, as in the first exemplary embodiment, the extraction unit 46 outputs the extracted associated services CM to the storage control unit 47, and the storage control unit 47 stores the transmitter IDs and the associated services CM in the associated service information 41 while associating the transmitter IDs and the associated services CM with each other.

In the second exemplary embodiment, the extraction unit 46 extracts a most used service as an associated service CM. That is, a service that is most likely to be selected by a user 13 (not limited to a user 13 who tends to select the same service every time) is extracted as an associated service CM.

The first and second exemplary embodiments may be combined together by, for example, enabling a user 13 to determine whether to use a previous service or a most used service as an associated service CM.

The number of associated services CM is not limited to one. A previous service and a service before the previous service may be extracted as associated services CM, instead. Alternatively, a most used service and a second most used service may be extracted as associated services CM.

A taste of a user 13 may be determined on the basis of an activity history of the user 13 (a movement history, a purchase history, a web browsing history, etc.), and a service according to the determined taste may be extracted as an associated service CM. For example, if it is found from the activity history that the user 13 frequently visits a soccer field and purchases a soccer magazine, it is determined that soccer is a hobby of the user 13. A service relating to purchase of tickets for soccer games, therefore, is extracted as an associated service CM. If analysis data indicates, for example, that users 13 who purchase tickets for soccer games are likely to buy express bus tickets at the same time, a service relating to purchase of express bus tickets may also be extracted as an associated service CM. An associated service CM is thus not limited to a service used by a user 13 in the past.

The hardware configuration of a computer that serves as the management server 11 may be modified in various ways. For example, the management server 11 may be a plurality of server computers separate from each other as hardware in order to improve processing performance and reliability. More specifically, a server computer performs the functions of the obtaining unit 45 and the extraction unit 46 and another server computer performs the functions of the storage control unit 47 and the display control unit 48. In this case, the two server computers serve as the management server 11.

The system program 40 may be installed on the service provision apparatus 10, and the processing units 45 to 48 built in the management server 11 in each of the above exemplary embodiments may be built in the service provision apparatus 10. Alternatively, the service provision apparatus 10 may perform the functions of some of the processing units 45 to 48, and the management server 11 may perform the rest of the functions.

The hardware configuration of a computer can thus be modified in accordance with required levels of processing performance, safety, reliability, and the like. Furthermore, it is needless to say that not only hardware but also the application programs such as the system program 40 may be redundant or distributed among a plurality of storage devices in order to secure safety and reliability.

In the above exemplary embodiments, the following various processors may be used for the hardware configuration of the processing units that perform various processes, such as the obtaining unit 45, the extraction unit 46, the storage control unit 47, and the display control unit 48. The various processors include a programmable logic device (PLD), which is a processor in which a circuit configuration can be changed after a field-programmable gate array (FPGA) is fabricated, and a dedicated electrical circuit, which is a processor having a circuit configuration designed exclusively to perform certain processes, such as an application-specific integrated circuit (ASIC), as well as, as described above, a CPU, which is a general-purpose processor that functions as the various processing units by executing software (system program 40).

A processing unit may be achieved by one of the various processors or a combination of two or more processors of the same type or different types (e.g., a combination of a plurality of FPGAs or a combination of a CPU and an FPGA). A plurality of processing units may be achieved by a single processor.

When a plurality of processing units are achieved by a single processor, for example, the processor may be achieved by a combination of one or more CPUs and software and function as the plurality of processing units as in the case of a client computer, a server computer, or the like. Alternatively, a processor in which a single IC chip achieves the functions of the entirety of the system including the plurality of processing units may be used as in the case of a system on chip (SoC). The various processing units are thus achieved by one or more of the various processors as a hardware configuration.

More specifically, as the hardware configuration of the various processors, electrical circuitry obtained by combining together circuit elements such as semiconductor elements may be used.

The following Item 1 is established from the above description.

Item 1

A service provision system includes:

an extraction processor that extracts, from a plurality of services of a service provision apparatus, an associated service corresponding to a user of the service provision apparatus;

a storage control processor that stores identification information for identifying a transmitter which is carried by the user and which transmits a wireless signal and information regarding the associated service in a storage unit while associating the identification information and the information regarding the associated service with each other;

an obtaining processor that obtains the identification information included in the wireless signal transmitted without requiring the user to perform an operation; and a display control processor that receives, from the storage control processor, the associated service corresponding to the identification information obtained by the obtaining processor and that displays the associated service on a display unit of the service provision apparatus.

The techniques in the present disclosure may be achieved by combining the above exemplary embodiments and various modifications with each other. Aside from the above exemplary embodiments, various configurations may be employed without deviating from the scope of the present disclosure.

The techniques in the present disclosure also apply, in addition to a program, to a storage medium storing the program. More specifically, the application programs such as the system program 40 are not limited to a mode in which the application programs are stored in the storage device 30 as in the above exemplary embodiments. The system program 40 may be stored in a computer readable medium and provided. The computer readable medium may be, for example, an optical disc such as a compact disc read-only memory (CD-ROM) or a digital versatile disc read-only memory (DVD-ROM) or a semiconductor memory such as a universal serial bus (USB) memory or a memory card. Alternatively, the system program 40 may be obtained from an external apparatus through a communication line such as the WAN 12 connected to the communication unit 33.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A service provision system comprising:
    a storage device; and
    a processor coupled to the storage device and configured at least to:
    obtain an identification information of a transmitter without requiring a user to perform an operation;
    display a plurality of services of a service provision apparatus, wherein the plurality of services are initial services which are displayed regardless of the user;
    store, in the storage device, the identification information for identifying the transmitter which is powered by a battery and is carried by the user and which transmits a wireless beacon signal and an associated service information which associates, per entry, the identification information, a user identification information obtained from a payment card, and an associated service with each other;
    extract, based on the associated service information, an associated service in response to obtaining the identification information of the transmitter; and
    display the associated service on a display panel of the service provision apparatus.

2. The service provision system according to claim 1, wherein the processor is further configured to extract the associated service from services used by the user in past on the service provision apparatus.

3. The service provision system according to claim 2, wherein the processor is further configured to extract a service used by the user last e as the associated service.

4. The service provision system according to claim 3, wherein the processor is further configured to extract a service most used by the user as the associated service.

5. The service provision system according to claim 4, wherein the processor is further configured to control the display panel to display both the associated service and the initial service on the display unit in a distinguishable manner.

6. The service provision system according to claim 5, wherein the processor is further configured to superimpose the associated service smaller than the initial service upon the initial service.

7. The service provision system according to claim 3, wherein the processor is further configured to control the display panel to display both the associated service and the initial service on the display unit in a distinguishable manner.

8. The service provision system according to claim 7, wherein the processor is further configured to superimpose the associated service smaller than the initial service upon the initial service.

9. The service provision system according to claim 2, wherein the processor is further configured to extract a service most used by the user as the associated service.

10. The service provision system according to claim 9, wherein the processor is further configured to control the display panel to display both the associated service and the initial service on the display unit in a distinguishable manner.

11. The service provision system according to claim 10, wherein the processor is further configured to superimpose the associated service smaller than the initial service upon the initial service.

12. The service provision system according to claim 2, wherein the processor is further configured to control the display panel to display both the associated service and the initial service on the display unit in a distinguishable manner.

13. The service provision system according to claim 12, wherein the processor is further configured to superimpose the associated service smaller than the initial service upon the initial service.

14. The service provision system according to claim 1, wherein the plurality of services includes an initial service displayed first on the display unit regardless of the user, and
    wherein the processor is further configured to control the display panel to display both the associated service and the initial service on the display unit in a distinguishable manner.

15. The service provision system according to claim 14, wherein the processor is further configured to superimpose the associated service smaller than the initial service upon the initial service.

16. The service provision system according to claim 1, wherein the processor is further configured to enable the user to switch between the associated service and the initial service through a single operation.

17. The service provision system according to claim 1, wherein, if the identification information obtained by the obtaining unit is new and there is no associated service corresponding to the identification information, the processor is further configured to display the initial service on the display unit.

18. The service provision system of claim 1, wherein the wireless beacon signal is transmitted by the transmitter periodically, and the transmitter further transmits the identification information until the battery runs out as long as the battery is connected.

19. A non-transitory computer readable medium storing a program that is used for a service provision system, which includes a service provision apparatus including a plurality of services, and that causes a computer comprising a storage device and a processor which executes functions comprising:
- obtaining an identification information of a transmitter without requiring a user to perform an operation;
- displaying the plurality of services of the service provision apparatus, wherein the plurality of services are initial services which are displayed regardless of the user;
- storing, in the storage device, the identification information for identifying the transmitter which is powered by a battery and is carried by the user and which transmits a wireless beacon signal and an associated service information which associates, per entry, the identification information, a user identification information obtained from a payment card, and an associated service with each other;
- extracting, based on the associated service information, an associated service in response to obtaining the identification information of the transmitter; and
- displaying the associated service on a display panel of the service provision apparatus.

20. A service provision system comprising:
a service provision apparatus including
- obtaining means for obtaining an identification information of a transmitter without requiring a user to perform an operation;
- display means for displaying a plurality of services of the service provision means, wherein the plurality of services are initial services which are displayed regardless of the user;
- storage control means for storing, in storage means, the identification information for identifying transmission means which is powered by a battery and is carried by the user and which transmits a wireless beacon signal and an associated service information which associates, per entry, the identification information, a user identification information obtained from a payment card and an associated service with each other;
- extracting means to extract, based on the associated service information, an associated service in response to obtaining the identification information of the transmitter; and
- the display means further displaying the associated service on the display means of the service provision means.

* * * * *